United States Patent [19]
Buchanan

[11] Patent Number: 5,306,034
[45] Date of Patent: Apr. 26, 1994

[54] VEHICLE WHEEL SUSPENSION SYSTEM

[76] Inventor: Gregory Buchanan, 109 S. Main St., Nazerth, Pa. 18064

[21] Appl. No.: 101,781

[22] Filed: Aug. 3, 1993

Related U.S. Application Data

[63] Continuation of Ser. No. 822,410, Jan. 17, 1992, abandoned.

[51] Int. Cl.⁵ .................................................. B60G 3/00
[52] U.S. Cl. ............................. 280/112.2; 280/675
[58] Field of Search ................ 280/112.2, 675, 688, 280/840

[56] References Cited

U.S. PATENT DOCUMENTS

| | | | |
|---|---|---|---|
| 2,978,255 | 4/1961 | Rosenkrands | 280/112 |
| 3,598,385 | 8/1971 | Parsons, Jr. | 267/20 |
| 4,159,128 | 6/1979 | Blaine | 280/112.2 |
| 4,373,743 | 2/1983 | Parsons, Jr. | 280/661 |
| 4,469,350 | 9/1984 | Inoue | 280/675 |
| 4,515,390 | 5/1985 | Greenberg | 280/675 |
| 4,854,603 | 8/1989 | Scaduto | 280/675 |

FOREIGN PATENT DOCUMENTS 0319391  6/1989  European Pat. Off. ............ 280/688

*Primary Examiner*—Margaret A. Focarino
*Assistant Examiner*—Paul Dickson
*Attorney, Agent, or Firm*—Dann, Dorfman, Herrell and Skillman

[57] ABSTRACT

A suspension system for connecting a wheel mount to a frame of a vehicle wherein the wheel mount is provided with a rigid extension above the wheel spindle on the wheel mount extending into proximity of the chassis and overlapping the chassis, the linkages connected between the end of the rigid extension and the frame using parallel pin means at each end. Both the extension and the linkage may be made double or otherwise more rigid. A second generally horizontal linkage is connected by similar parallel rotation-permitting pins at one end to the wheel support and at the other to the frame. Suspension systems are usually symmetrical so that wheels on opposite sides of the frame are connected by similar linkages.

12 Claims, 5 Drawing Sheets

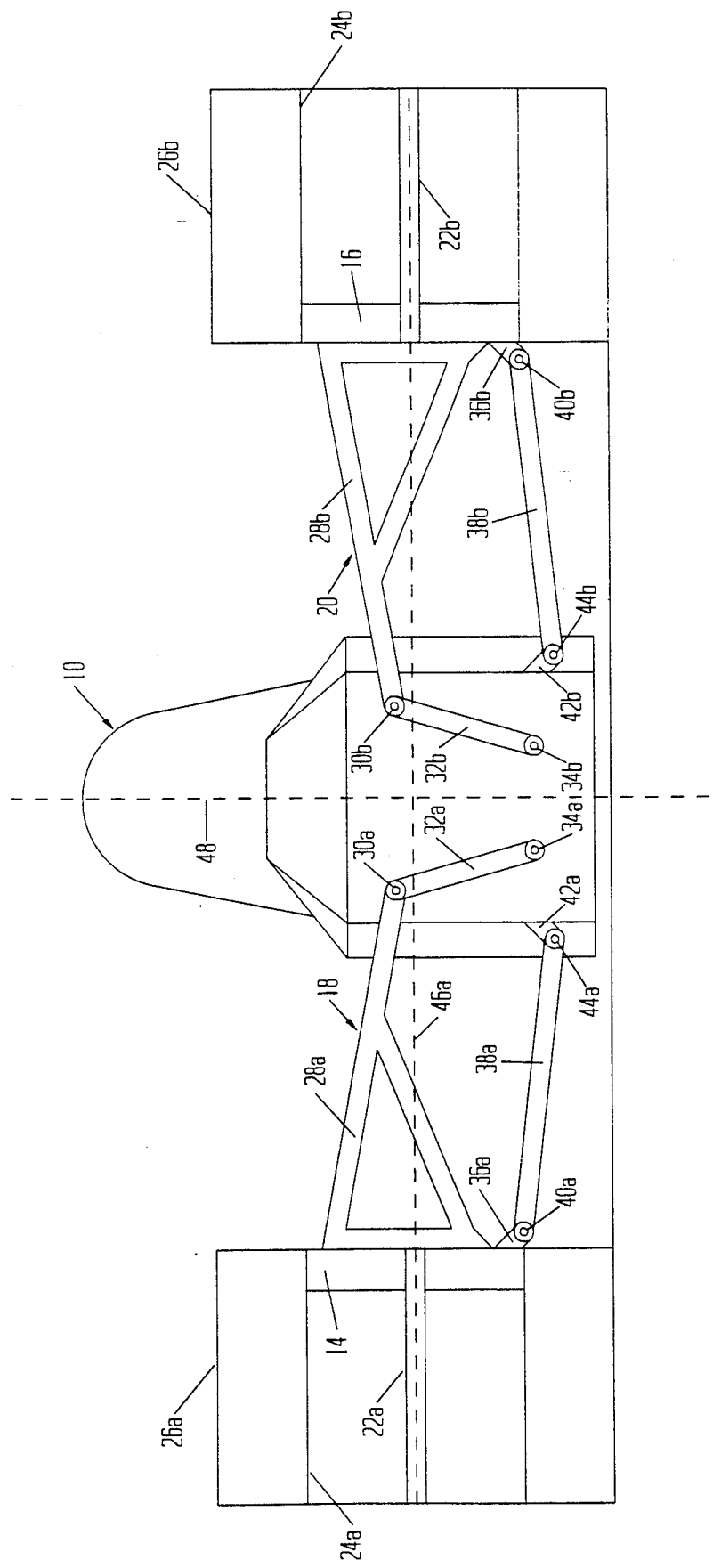

Dynamic

Static

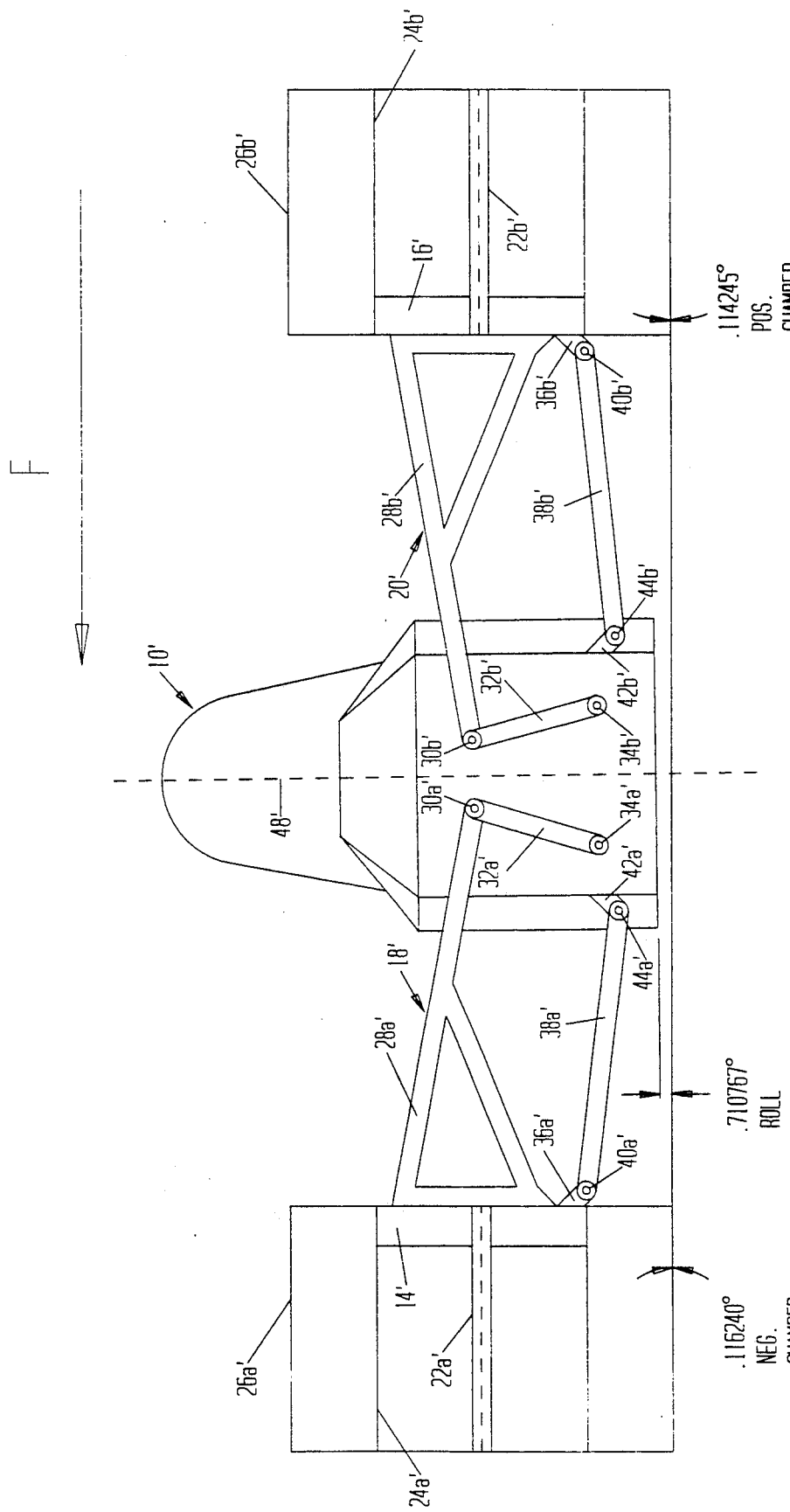

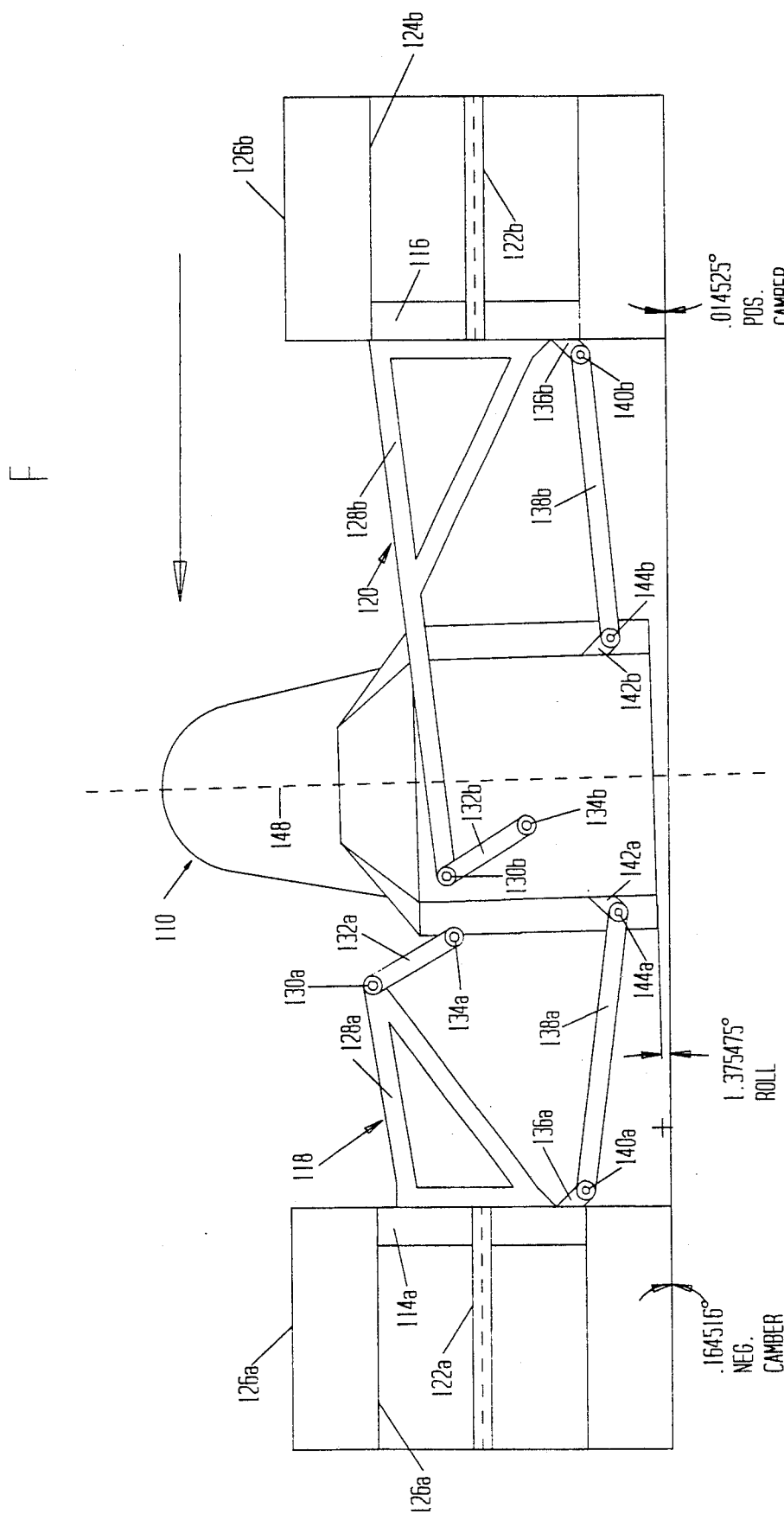

VEHICLE WHEEL SUSPENSION SYSTEM

This is a continuation of copending application Ser. No. 07/822,410, filed Jan. 17, 1992, now abandoned.

The present invention relates to a vehicle wheel suspension. More specifically, the present invention concerns a pair of linkage members for connecting a wheel support to a vehicle frame using pivotal connections to create a relatively low roll center and cause good camber position at the support of the wheel as the vehicle travels around curves on a relatively flat road bed.

BACKGROUND OF THE INVENTION

The "grip" or contact patch of a tire is directly related to the camber angle of the wheel relative to the vehicle frame. The camber angle is affected by many variables related to the dynamics of the vehicle system. Some of these are the car's roll center, the amount of centrifugal force being exerted, the amount of spring and shock resistance, and the degree of the turn.

In the prior art, many people have attempted to design a vehicle suspension system to maximize the contact patch between a tire and the road. Typically the suspension system employed between the wheel support and the frame have consisted of parallel A-frames each pivotally supported both to the wheel support and the vehicle frame. None has provided a fixed non-pivotal rigidly connected as an extension to the wheel support. In the prior art there have been many attempts to improve upon vehicle suspension systems, but in one way or another each of these systems has increased the complexity of the structure, thus complicating adjustment and maintenance and making its use impractical. Many such systems have made manipulation of one wheel support associated with a particular axle dependent in some way upon manipulation of other wheel support along its common axle. In some systems interdependence has actually produced harmful effects on the wheel mount for one wheel when achieving desirable effects on the other. There is consequently still a need for a simple system providing maximum contact patch and acting independently on each of the wheel supports so that each wheel along a given axis can achieve good camber position for straight-away runs and effective adaptation for handling curves.

THE NATURE OF THE PRESENT INVENTION

The present invention relates to a double arm suspension in which the arms approach perpendicularity to one another instead of being generally parallel. In order to accomplish this geometry, each of the wheel supports provides a rigid extension rigidly and non-pivotally connected to and extending from the wheel spindle to at least the edge of the frame, which may include extensions thereof. Then a first connecting arm is pivotally connected at each end between the extension and the frame. Below the wheel spindle a conventional generally horizontal connecting second arm connection is pivotally connected at each end between the wheel support and the frame. Although there is great variation, particularly in the position of the first arm, its relationship to the second arm can better be characterized as more nearly perpendicular to the second arm than horizontal.

By utilizing this construction, since the linkages to the respective wheel supports are independent of one another, it is possible to maintain a slightly negative camber on an outside tire and a slightly positive camber on the inside tire when turning and maintain essentially no camber angle when the vehicle is traveling in a straight path. In this way the gripping surface of each tire can be increased considerably. The arrangement allows the vehicle to roll straight with less friction. In the course of self adjustment on curves in the road the frame pivots relative to the respective wheel supports around the theoretical roll center of the vehicle. By contrast, movement in rounding curves using a parallel arm suspension system will cause the outside tire to have the proper condition, but the inside tire tends to assume exactly the opposite camber from that needed for proper traction. It also adds to uneven tire wear. In accordance with the present invention, the inside tire maintains proper camber direction for maximum traction. This will provide not only better traction, but more even tire wear which will lead to extended tire life. In theory, for proper handling characteristics, a parallel suspension requires that both tires have a slightly negative camber. In accordance with the present invention, the suspension may be adjusted to provide essentially zero camber to the wheels when the car is in a normal straight path.

More specifically, the present invention relates to a wheel suspension system for a vehicle having a central frame. At least one wheel support located to one side of said frame employs the suspension and has a wheel mounting spindle means thereon. A rigid extension is rigidly and non-pivotally connected to and extends from the wheel support to at least the edge of the frame. An upper linkage is pivotally connected at one end to the rigid extension and at the other end to the frame between its center line and the edge adjacent the wheel support. A lower linkage is pivotally connected at one end to the lower portion of the wheel support and at the other end to said frame. The pivotal connections are so located relative to each other that they create a relatively low roll center and cause a slightly negative camber on the inside tire and a slightly positive camber on the outside tire when turning at the wheels supported on the respective wheel supports as the vehicle travels around curves on a relative flat road bed.

While in most situations if a wheel on one side of the vehicle is mounted in this way, the wheel on the other side is also mounted in this way to produce similar action on both wheels. However, as will be explained hereafter, there are situations in which only one wheel may be involved, for example, in a circular or oval race track where turns are made in only one direction where non-symmetrical arrangements have advantage.

THE DRAWINGS

For a better understanding of the present invention reference is made to the drawings in which:

FIG. 1A is a schematic showing of a vehicle suspension along one axle only under static conditions or conditions during a straight run;

FIG. 2B is a schematic similar to FIG. 2A showing the same structure under dynamic conditions experienced in turning; and FIG. 3 is a schematic drawing similar to FIGS. 1B and 2B but showing a specialized structure for use on circular or oval tracks where turns are always in the same direction.

DETAILED DESCRIPTION OF THE PRESENT INVENTION

Figure 1B:
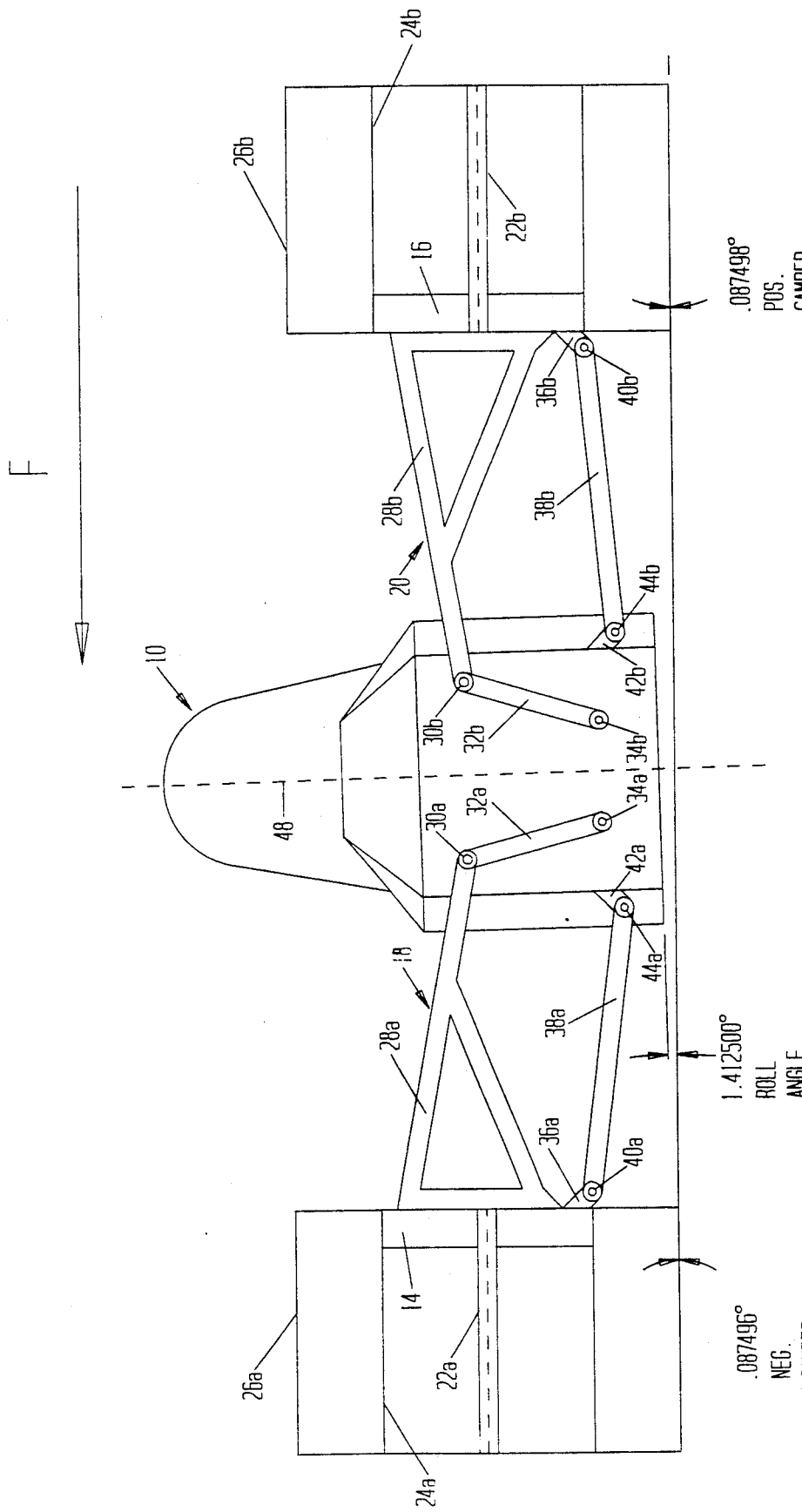
FIG. 1B is a similar schematic showing the same structure under dynamic conditions experienced in turning.

FIGS. 1A and 1B schematically represent a vehicle generally designated 10 having a chassis/frame 12 and a pair of wheel mounts 14 and 16 that are connected by a linkage suspension system 18 and 20 respectively. The wheel supports 14 and 16 respectively carry similar axle or wheel spindle members 22a and 22b. The spindle members 22a and 22b, in turn, support similar rims 24a and 24b. Rims 24a and 24b, in turn, carry tires 26a and 26b. The chassis/frame and wheel structures are conventional, but the suspension system is novel.

In a conventional suspension system parallel A-frame linkages would join each wheel support to the frame. In the present invention a rigid extension 28a is rigidly and non-pivotally connected to and extends from the wheel support 14 toward and into proximity to the frame 12. A similarly configured rigid extension 28b extends from wheel support 16. Extensions 28a and 28b may typically be rigid double member extensions of parallel, A-frame or other suitable geometry. Remote from the wheel support at the end of the extension 28a, 28b, which is preferably at least at the edge of the vehicle chassis and here extends well inside the edge, is a rotatable pin connection 30a, 30b, respectively connecting the rigid extension 28a to linkage 32a and connecting the rigid extension 28b to linkage 32b. Linkages 32a and 32b take a form suitable for cooperation with the rigid extension which is typically a double member structure, such as an A-frame. Linkages 32a and 32b, respectively, are rotatably attached by pins 34a and 34b to the frame 12 and thereby provided with a large vertical component in their orientation. Linkages 38a and 38b are rotatably attached to wheel supports 14 and 16 at brackets 36a and 36b using pins 40a and 40b, respectively. These generally horizontally extending linkages 38a and 38b are connected at their opposite ends, respectively, to brackets 42a and 42b on frame 12 by pins 40a and 40b. All pins in the linkages are generally parallel.

It will be observed that the axis of the wheel spindle 22a shown in FIG. 1A as a broken line 46a will intersect with the center line 48 of the chassis/frame 12, also shown as a broken line. The linkage arrangement will cause the roll center to be located just above the surface of the roadway thereby enhancing stability of the vehicle while achieving the ability of the wheels to tilt in a direction reverse to the tilting of the chassis. The linkages 32a and 32b are preferably kept within an angle of approximately 45° from the vertical in either direction. The rotatable connections 34a and 34b are preferably maintained on the same side of the center line 48 as the wheel mount, i.e., connection 34a, is on the same side as wheel mount 14. It is possible to go beyond the center line but quality deteriorates quickly.

FIG. 1B is intended to show the action of the linkage on one side of the structure of FIG. 1A as the vehicle goes from a straight path to one around a curve during which centrifugal force is in effect. As seen, the centrifugal force applied causes a straight tilt in the chassis.

Figure 2A:
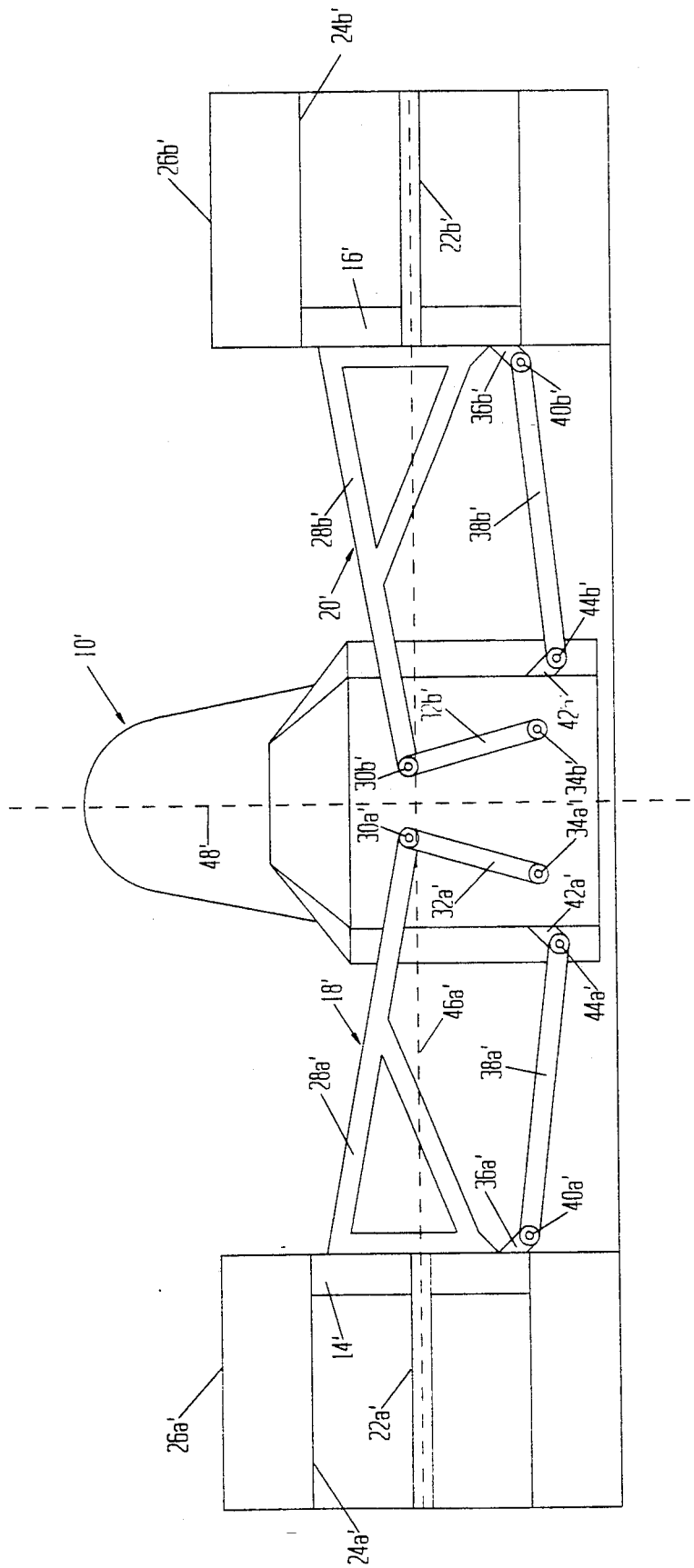
FIG. 2A is a schematic drawing similar to FIG. 1A employing a somewhat modified structure also under static conditions or conditions during a straight run.

Referring to FIG. 2A, a modified structure similar to FIG. 1A is shown wherein corresponding numbers are used with the addition of primes thereto to designate corresponding parts. The principal change has to do with the extension of the rigid extensions 28a' and 28b', respectively, toward the center line 48 and in this case the displacement of the pivotal connections 34a' and 34b' of the linkages 32a' and 32b' somewhat outboard of the position shown in FIG. 2A. In both cases, however, the links 32a and 32b and 32a' and 32b' are arranged so that a major component of their orientation is vertical as compared to the primarily horizontal arrangement of the links 38a and 38b and 38a' and 38b'.

By making linkage 32a more nearly perpendicular to linkage 38a than the parallel arrangement of the prior art, makes it possible to maintain a slightly negative camber on the outside tire on the side making a turn and a slightly positive camber on the inside tire. The same linkage maintains essentially no camber angle when the vehicle is traveling in a straight path as seen in FIG. 1A when no centrifugal force is applied. The purpose, of course, is to increase considerably the contact patch in effect at the gripping surface at all times and at the same time to allow the vehicle to roll straight with less friction.

When the prior art chassis/frame has pivoted around the theoretical roll center, a parallel suspension will cause the outside tire to have proper camber direction. However, the inside tire has had exactly the opposite camber from that needed for proper traction, thereby causing uneven tire wear. By contrast the suspension of the present invention maintains both tires at the proper camber direction for maximum traction and more even tire wear which will lead to extended tire life. For proper handling, a parallel suspension system requires that both tires have a slightly negative camber on the straightaway. The present invention enables vehicles to have essentially zero camber on the straightaway with better results.

Great variations can occur in configuration of the invention and in accordance with the invention relatively wide latitudes are permitted. However, it has been observed that as the angle from the vertical increases the effectiveness of the linkage from the extension diminishes so that, past 45° each side of the vertical, the effect become very markedly reduced. Similarly, keeping the linkage on the same side of the center line as the wheel which it controls is preferable. Keeping the rigid extension sufficiently long to at least reach the edge of the chassis/frame is likewise preferred. The latter is desirable both to help maintain the vertical component of the linkage and to keep the rigid extension at least as long, and preferably longer, than the linkage that it supports.

Reference is now made to FIG. 3 which involves a vehicle having a linkage structure which is intended for going only one way around a circular or oval track. The centrifugal forces are in the direction shown by the arrow labeled F. In this particular situation it is desirable to give maximum adjustability to the inside tire and the effect on the outside tire can be therefore minimized while retaining the advantage of the linkage system. Here again the same number designators are used with a prefix of 1, but it will be observed that instead of the symmetrical system of FIGS. 1A, 1B, 2A and 2B, on the "b" side of the vehicle away from which force is applied, the linkage is extended whereas the linkage is minimized on the "a" side toward which force is applied. Furthermore, some of the limitations preferably imposed on a symmetrical system are omitted. Thus rigid extension 128a does not reach the edge of the frame 112, whereas rigid extension 128b extends past the center line 148. Here again the rigid extensions 128a and 128b are rigidly and non-pivotally connected to the wheel support 114a and 114b, respectively. Here to keep the vertical component large linkage 132b is also entirely on the opposite side of the center line from wheel support 116.

Various modifications of the invention have been shown and described herein. Other modifications and variations within the scope of the claims will occur to those skilled in the art. All such modifications and variations within the scope of the appended claims are intended to be within the scope and spirit of the present invention.

I claim:

1. A wheel suspension system providing independent suspension of each wheel for a vehicle having a central frame with a front and back centerline in which seating for a driver is provided comprising in combination,
    first and second wheel supports located on opposite sides of said frame and each having wheel-mounting spindle means thereon,
    a rigid extension rigidly and non-pivotally, parallel to the centerline, connected to and extending from each of the wheel supports to at least the edge of the frame,
    upper linkages, each respectively pivotally connected, at one end to the associated rigid extension and at the other end to the frame,
    lower linkages, each respectively pivotally connected at one end to a portion of the associated wheel support, and at the other end to said frame,
    said pivotal connections being located relative to each other whereby the pivotal connections create a relatively low roll center and cause a negative camber on the outside wheel and a positive camber on the inside wheel as the vehicle travels around curves on a relatively flat roadbed.

2. The wheel suspension system of claim 1 in which the pivotal connections at the linkages are all pin connections providing axes of rotation generally parallel to one another.

3. The wheel suspension system of claim 2 in which the linkages are arranged essentially symmetrical about the center line of the frame.

4. The wheel suspension system of claim 3 in which the upper linkage in each case has a vertical component.

5. The wheel suspension system of claim 4 in which each rigid extension does not pass the center line of the frame.

6. A wheel suspension system providing independent suspension of each wheel for a vehicle having a central frame with a front ad back centerline comprising in combination,
    first and second wheel supports located on opposite sides of said frame and each having wheel-mounting spindle means thereon,
    a rigid extension extending from each of the wheel supports to at least the edge of the frame, but not past the centerline,
    upper linkages, each oriented between vertical and 45° of the vertical and each respectively pivotally connected, at one end to the associated rigid extension and at the other end to the frame,
    lower linkages, each respectively pivotally connected at one end to a portion of the associated wheel support, and at the other end to said frame,
    said pivotal connections being pin connections providing axes of rotation generally parallel to one another whereby the linkages are arranged essentially symmetrically about the centerline of the frame to create a relatively low roll center and cause a negative camber on the outside wheel and a positive camber on the inside wheel as the vehicle travels around curves on a relatively flat roadbed.

7. The wheel suspension system of claim 6 in which each upper linkage does not cross the center line of the frame.

8. A wheel suspension system providing independent suspension of each wheel for a vehicle having a central frame with a front and back centerline designed for a closed loop track on which vehicles run in one direction, thereby defining an inside wheel as being on the inside of the closed loop comprising in combination,
    first and second wheel supports located on opposite sides of said frame and each having wheel-mounting spindle means thereon,
    a rigid extension extending from each of the wheel supports to at least the edge of the frame, such that the rigid extension from the inside wheel support is considerably longer than the rigid extension from the outside wheel support,
    upper linkages, each respectively pivotally connected, at one end to the associated rigid extension and at the other end to the frame,
    lower linkages, each respectively pivotally connected at one end to a portion of the associated wheel support, and at the other end to said frame,
    said pivotal connections being pin connections providing axes of rotation generally parallel to one another whereby the linkages are arranged non-symmetrically about the center of the frame to create a relatively low roll center and cause a negative camber on the outside wheel and a positive camber on the inside wheel as the vehicle travels around curves on a relatively flat roadbed and greater camber control is achieved on the inside wheel of a vehicle intended to run one direction around a closed circular or oval track.

9. A wheel suspension system for a vehicle, providing independent suspension of each wheel, having a central frame with a front and back centerline in which seating for a driver is provided, comprising in combination,
    first and second wheel supports located beyond opposite sides of said frame and each having wheel-mounting spindle means thereon,
    a rigid extension rigidly and non-pivotally, parallel to the centerline, connected to and extending from each of the wheel supports to a point at least to the edge of the frame,
    an upper linkage associated with each extension, pivotally connected at one end to the associated rigid extension by a pivot and at the other end to the frame on the same side of the center line of the frame as the wheel support having the rigid extension supporting said upper linkage,
    a lower linkage for each wheel support having one end pivotally attached to a lower portion of said associated wheel support, and having the other end pivotally attached to said frame,
    the aforesaid linkages being placed to create a relatively low roll center and a negative camber on the outside wheel and a positive camber on the inside wheel as the vehicle travels around curves on a relatively flat roadbed.

10. The wheel suspension system of claim 9 in which the pivotal connections at the linkages are all pin connections providing axes of rotation generally parallel to one another.

11. The wheel suspension system of claim 10 in which the linkages are arranged essentially symmetrical about the center line of the frame and the upper linkage in each case has a vertical component.

12. The wheel suspension system of claim 11 in which each upper linkage is oriented between vertical and 45° of the vertical.

* * * * *